United States Patent
Halevi et al.

(10) Patent No.: US 7,046,429 B2
(45) Date of Patent: May 16, 2006

(54) METHOD AND SYSTEM FOR SPAN OPTICAL POWER CONTROL

(75) Inventors: Ilan Halevi, Petach-Tikva (IL); Tsvi Sivan, Raanana (IL); Mordechay Tuby, Petach-Tikva (IL); David Harris, Jerusalem (IL)

(73) Assignee: ECI Telecom Ltd., Petach Tikva (IL)

( * ) Notice: Subject to any disclaimer, the term of this patent is extended or adjusted under 35 U.S.C. 154(b) by 342 days.

(21) Appl. No.: 10/461,332

(22) Filed: Jun. 16, 2003

(65) Prior Publication Data

US 2004/0037564 A1 Feb. 26, 2004

(30) Foreign Application Priority Data

Jun. 20, 2002 (IL) .................................... 150347

(51) Int. Cl.
H04B 10/12 (2006.01)
(52) U.S. Cl. ............................. 359/337.1; 359/337.11; 398/160
(58) Field of Classification Search ............. 359/337.1, 359/337.11; 398/360, 160
See application file for complete search history.

(56) References Cited

U.S. PATENT DOCUMENTS

| 5,959,749 | A | 9/1999 | Danagher et al. |
| 6,040,933 | A | 3/2000 | Khaleghi et al. |
| 6,163,399 | A | 12/2000 | Berg |
| 6,341,034 | B1 * | 1/2002 | Sun et al. .............. 359/341.41 |
| 6,366,393 | B1 * | 4/2002 | Feulner et al. .............. 359/337 |
| 6,621,621 | B1 * | 9/2003 | Jones et al. ............ 359/337.11 |
| 6,654,561 | B1 * | 11/2003 | Terahara et al. .............. 398/26 |
| 2004/0146306 | A1 * | 7/2004 | Muzicant et al. ........... 398/177 |

FOREIGN PATENT DOCUMENTS

| EP | 1130802 | 2/2001 |
| EP | 1079481 | 9/2001 |

* cited by examiner

Primary Examiner—Jack Keith
Assistant Examiner—Eric Bolda
(74) Attorney, Agent, or Firm—Browdy & Neimark, PLLC

(57) ABSTRACT

There is proposed a method and a module for real time control of power per optical channel in a multi-channel optical communication line formed by a group of optical elements connected in a chain by fiber spans. The group of elements comprises one or more optical fiber amplifiers (OFA); each of the spans is characterized by its span loss, while each of the OFA is characterized by its gain and its designed output power per channel. The method comprises steps of calculating an expected total input power value (EIP) for a particular optical amplifier (OFA) in the line, measuring a real total input power (MIP) at the particular optical amplifier, and comparing the values. If a difference between the EIP and the MIP at the OFA exceeds a predetermined value, the method (and the module) ensures adjusting the gain of the OFA to maintain its output power per channel constant.

21 Claims, 5 Drawing Sheets

METHOD AND SYSTEM FOR SPAN OPTICAL POWER CONTROL

FIELD OF THE INVENTION

The present invention relates to a technique of balancing power provided at the output of a network element handling multiple optical channels and being part of a chain of network elements in a telecommunication line.

BACKGROUND OF THE INVENTION

Those skilled in the art are familiar with a problem that, in a point-to-point optical communication line (which comprises a number of network elements, such as optical fiber amplifiers OFA connected in series, and possibly, one or more optical add-drop multiplexers OADMs), one should pay attention to power equalization between multiple optical channels outputted by one network element to be sent to another one.

The amplifiers may work according to one of the following principles:

1. the principle of fixed output power (when the fixed output power is divided to a required number of the output channels—which leads to underpowering if the number of channels is max, and to a very dangerous overpowering where the number of output channels is low, say in a case of fiber cut before an OADM that adds few channels into an OFA.

2. the principle of fixed power dependent on the number of channels, wherein the amplifier output power is controlled with respect to the number of channels, so as to provide a fixed output power per channel. (for example, one channel—1 mW, 15 channels 15 mW, 40 or more channels—40 mW max). In the known technologies, the number of channels is usually stated (say, by an operator) from time to time.

3. the principle of fixed gain; according to that, the amplifier has a fixed gain so that each channel, whatever input power exists in it, is amplified with the same gain as other channels. To maintain the required output power, it is known to arrange a feedback loop measuring, the input and the output power and, based on the result, capable of regulating the output power of the amplifier. In the fixed gain scheme, in order to obtain equal and fixed output powers of the channels at the output of the amplifier, it is only possible to ensure that the input powers be equal and fixed. To maintain the condition, it is known to insert a VOA (Variable Optical Attenuator) into the input optic fiber, to adjust the input power of the optical channels which arrive to the amplifier.

The prior art does not comprise any idea of a dynamic span power equalization or control in a chain of network elements, comprising OFAs and OADMs. The problem stems from the facts that a) no dynamic monitoring of the chain parameters has been proposed, and b) elements of the chain may be different and thus behave differently, but no common concept of optical power control has been proposed for such a chain.

OBJECTS OF THE INVENTION

The object of the present invention is to propose a technique for power control in a multi channel optical transmission line, which at least partially overcomes the above disadvantages.

SUMMARY OF THE INVENTION

The main idea is a method of real time control of power per optical channel in a multi-channel optical communication line formed by a group of optical elements connected in a chain by fiber spans, wherein the group of elements comprises one or more optical fiber amplifiers (OFA), and wherein each of the spans is characterized by its span loss, while each of the OFA is characterized by its gain and its designed output power per channel, the method comprises the following steps performed either periodically or continuously:

calculating, for a particular optical amplifier (OFA) in the line, an expected total input power value EIP, measuring a real total input power (measured input power MIP) at said particular optical amplifier, and if a difference between the expected total input power and the real total input power at said particular OFA exceeds a predetermined value, adjusting the gain of said OFA to maintain its output power per channel constant.

Preferably, the step of calculating the expected total input power is performed using up-to date values of NOC (number of active incoming channels) and NOA (number of preceding optical amplifiers in the line).

NOC can be determined, for example, by providing spectral analysis in real time at each particular optical element. Industrial spectrum analyzers are known in the art.

Alternatively, NOC can be determined with the aid of messages transmitted in the line via a supervisory channel, using the method described in the Applicant's earlier patent application IL 145262 and the corresponding U.S. Ser. No. 09/962,337, priority of Sep. 4th, 2001 which is incorporated herein by reference.

NOA of an optical amplifier and of a passive optical element such as OADM can be determined as follows:

For OFA: NOA out=[(NOAin+1) and (not LOS)] or (LOS)and 1;

For OADM: NOA out=[NOAin and (not LOS)] or (LOS) and 0;

where NOA out—NOA at the output of the optical element,
NOA in—NOA at the input of the optical element,
LOS—Loss Of Signal alarm, accompanies a fiber cut condition.

The step of maintaining of the output power per channel constant means maintaining it substantially equal to the designed one, i.e., to the output power per channel stated by a preliminary design of the line (in other words, by the line configuration).

The method is hybrid since it combines the approach of fixed gain and the approach of fixed power per channel i.e., each OFA works with the fixed gain up to the moment when its output is to be corrected. Actually, the Inventors propose continuous monitoring of both the expected total input power of an OFA, and the real input total power in order to control the OFA, to maintain its output power like it received the expected input power and not the real one. It should be noted that when designing the line, the capability to introduce possible corrections should be taken into account, say, when selecting gains and/or types of OFAs, ranges of power loss of the fiber spans, and control circuits of some passive optical elements such as OADMs.

Preferably, the method is performed at all optical amplifiers OFA in the line, to maintain constant output power at the fiber spans associated with said OFAs, thereby enabling to avoid overpowering and under-powering at the outputs of OFAs by taking into account possible changes in the NOC and NOA.

The method is most advantageous when the group of elements in the line, in addition to the optical amplifiers, comprises one or more optical add drop multiplexers (OADMs). The reasons for that are as follows.

Firstly, the method is intrinsically adapted to take into account changes in NOC which are most usually caused if a fiber cut occurs before OADM, and/or if any re-arrangement is performed in OADMs. Secondly, the method will be suitable for equalizing output powers of channels outputted from OADM, which is essential for the proper operation in the line.

It can be recalled that any OADM is adapted to receive one or more incoming optical channels, to drop one or more of the received optical channels, to pass through the remaining received optical channels, to add one or more new optical channels and to output the added optical channels and the though (passed) optical channels. Any OADM is therefore characterized by three values of insertion loss: the first one for the through channels (IL through, from line input to line output), the second one for the dropped channels (IL drop, from line input to drop output) and the third one—for the added channels (IL add, from add input to line output).

For example, if an OADM receives a weakened input signal while it should not have been weakened (say, the number of channels has not changed and there is just a contact or a fiber degradation due to which the real total input power is lower than the expected total input power), and no measures are taken to take care of these effects, the outgoing through channels will be essentially weaker than the outgoing added channels. Such a result is highly undesired for further transmission. To prevent it, the input power of the added channels (i.e., the power of the added channels) can be controlled accordingly.

Based on the above, the preferred version of the method additionally comprises the following steps performed periodically or continuously:

calculating, for a particular OADM in the line, an expected total input power value, preferably using up-to date values of NOC (number of active incoming channels) and NOA (number of preceding optical amplifiers in the line), measuring a real total input power at said particular OADM, in case of a difference between the expected total input power and the real total input power at said particular OADM exceeds a predetermined value, controlling power of each of added channels of said OADM to follow said difference, thereby to equalize output power of all optical channels outgoing from said OADM.

In other words, adjusting the power of the added channels is provided to make the output power of each of said added channels equal to the output power of a through channel of said OADM, or to the average of the through channels output power.

Preferably, all OADMs in the line are monitored as proposed above, to ensure the equalized output power per channel in the fiber spans associated with said OADMs; provided that the spans associated with the OAs are also controlled, all fiber spans in the line will thereby be controlled to have constant power per channel for the OFAs and equalized power per channel for the OADMs.

As has been mentioned, the method formally comprises a preliminary step of designing (pre-configuring) the optical communication line and stating parameters from the following no exhaustive list including: gains of the optical amplifiers, span losses, stating initial values of NOC and NOA for any point in the line, and also an expected output power per channel for each optical amplifier OFA. In our method, this expected output power per channel is further maintained to be constant.

Generally, calculating the expected total input power (EIP) comprises determining it for the input of any particular optical element, based on information about gains of the preceding optical amplifiers, span loss from the previous amplifier up to the particular optical element, and updated values of NOC and NOA for said particular element. Preferably, the calculation takes into account also noise figures of the OFAs, or the average noise figure thereof.

The proposed formula for calculating EIP will be presented in the detailed description of the invention.

So, if the main idea of the invention is to have reliable means to calculate the actual (up-to-date) expected total optical power at any point in the network and to control the elements in the line, to compensate for any difference from the expected value, the formula of calculating EIP contributes to implementing the idea.

Returning to the proposed method of maintaining the expected power per channel, whenever the up-to-date EIP is calculated and compared with the measured total input power MIP, the difference will indicate the required correction to bring the optical element to a regime for controlling the output power per channel (for example, for ensuring the expected output power per channel the OFAs, as preliminarily designed).

The second important idea of the invention is to provide a universal way of determining the required correction for various types of optical elements in the line.

The difference between the updated expected total power and the real total power at a particular point in the line constitutes the required correction RC (R C=MIP−EIP [dB]) to be applied to the optical element to ensure at its output either a constant power per channel (for OFA) , or the equalized power per channel (OADM).

It should further be noted that a response time (time passing between the moment of detecting a difference between the EIP and MIP and the moment of introducing a compensating correction—Hold Off Time, HOT) is to be selected so that every element in the line can be updated on the NOC and NOA and be able to correct its output power not simultaneously, but after the previous elements have done the corrections if such were required.

As has been mentioned, elements in the network communication line may be of two types—optical amplifiers OFA and optical add drop multiplexers OADMs. According to the preferred version of the method, the proposed concept of power control is common to all elements in the line, though has its specific features for any one of the element types.

The OFA output power is corrected in inverse proportion with the measured input total power. In other words, in case the measured total input power is, for any reason, higher than the expected input power (MIP>EIP), the correction should be calculated to reduce the OFA gain, thereby to reduce the output total power and to avoid the dangerous overpowering. In the opposite case, if the measured (real) input total power is lower than the EIP (for example, there is an unexpected extra span loss before the optical element), the OFA gain is to be increased so that to compensate the extra span loss.

Gain new=Gain old−RC[dB]; where RC=MIP−EIP [dB]

It should be noted that OADM can be of two kinds—a conventional OADM and a so-called VMUX being an OADM formed by a combination of a demultiplexer (DMWX), a multiplexer (MUX), drop fibers, through fibers and fibers for add channels with variable optical amplifiers (VOAs).

In OADM and VMUX, the power of an added channel is corrected in a direct proportion with the measured input power.

Therefore:

$APPC\ new=APPC\ old[dBm]+RC[dB]$, where:

$RC=MIP-EIP[dB]$; $APPC$—added power per channel.

Though the above-described option to equalize power of output channels of OADM is preferred since it is accurate and universal (i.e., uses most of the calculations required for controlling output power per channel of OFA), there are other simpler options which also exist and can be used for controlling output power of the OADM added channels.

For example, for optical communication lines transmitting a great number of channels the noise produced by amplifiers is relatively low uniformly and thus can be neglected in the calculations. Therefore, the power of an OADM added channel can be calculated by measuring MIP and updating NOC, but without taking into account the NOA and noise figure parameters:

$APPC=[MIP-10\ \log(NOC)]-IL_{OADM} \pm CO[dBm]$, where APPC—is the added power per channel,

[MIP−10 log(NOC)]—gives an average input power per one incoming channel, which serves an indication of an output power of a through channel of the OADM;

$IL_{OADM}$—insertion loss introduced by OADM; this parameter takes into account the attenuation created by OADM to the add channel when the output power thereof is equal to the output power of the through channel; it can be estimated as $IL_{OADM}=IL_{through}-IL_{add}$.

±CO is a manually introduced channel offset, which is usually selected for a particular channel in order to give it a pre-emphasis.

There is further provided a system capable of implementing any version of the above-described method.

According to yet another aspect of the invention, there is proposed a module suitable for controlling output power per channel of an optical element in a telecommunication line comprising at least OFAs, and optionally OADMs interconnected by fiber spans, the module being capable of performing operations of the proposed method to serve the corresponding optical element.

For example, it can be an optical module comprising an optical element (OFA or OADM) and a control unit for controlling output power per channel of the optical element in real time, said optical element being designed to be coupled to an optical communication line via optical fiber spans and capable of receiving an incoming multi-channel optical signal to form an outgoing multi-channel optical signal, said control unit, in real time, being capable of:

calculating a value of expected total input power (EIP) of the optical element based on a number of parameters stated by a preliminary design of the line, and a number of parameters changeable during operation and including at least a number of active optical channels (NOC), obtaining a value of measured total input power (MIP) of the optical element, comparing the EIP with the MIP and, if the difference there between exceeds a predetermined value, producing a signal of a required correction to be applied to the optical element for controlling the output power per channel of the optical element.

The changeable parameters may include also NOA (number of preceding optical amplifiers), and the control unit is preferably operative to obtain up-to-date values of NOC and NOA for said optical element.

The control unit is preferably capable of calculating EIP according to the formula mentioned in the description of the method.

The optical module can be adapted for serving either OFA or OADM.

However, OADMs may be served by optical modules of a second type, such a module comprising an OADM and a control unit for controlling power of added channels of the OADM, the power of an OADM added channel can be calculated by measuring MIP and updating NOC:

$APPC=[MIP-10\ \log(NOC)]-IL_{OADM} \pm CO[dBm]$.

BRIEF DESCRIPTION OF THE DRAWINGS

The invention will further be described and illustrated with the aid of the following non-limiting drawings, in which:

FIG. 1b illustrates a time diagram explaining the proposed principle of optical power control in the line shown in FIG. 1a.

DETAILED DESCRIPTION OF THE PREFERRED EMBODIMENTS

The method described in the present application starts from a preliminary step of designing (pre-configuring) an optical communication line, comprising optical amplifiers and OADMs, by stating gains of the optical amplifiers, span losses, stating initial values of NOC and NOA for any point in the line, and also an expected output power per channel for each optical amplifier OFA. This expected output power per channel is further maintained to be constant.

The line is preliminarily designed (configured) and calculated to ensure, at each point thereof, the balanced (i.e., constant or equalized) power per optical channel in each span of the line at normal (predictable) conditions of the line's operation. The normal or predictable conditions are characterized by the following groups of parameters:

a) configuration parameters which must not change during the routine operation (nominal gains of the amplifiers; noise figures introduced by the amplifiers; span losses i.e., values of attenuation of the fiber spans);

b) parameters of the line which are pre-set for a particular configuration, but may change during the normal operation and should therefore be updatable, for example: a number of active optical channels (NOC) at a particular point of the line may change due to new settings at any preceding OADM or due to a fiber cut in any preceding span; a number of optical amplifiers before a particular point (NOA) may change due to a fiber cut in any preceding portion of the line.

According to the invention, changes of the updatable parameters (b), if occur, are used for updating the expected total input power. Updating the NOC and NOA can be done automatically via a supervisory channel in the optical line, either by element to element communication, or via a central control block calculating the NOC and NOA for each element in the line. In other words, each of the elements (or the central control block) should be capable of calculating the NOC and NOA based on the incoming NOC and NOA and LOS condition (the fiber cut condition) as well as information on the add and drop channels at each particular element.

Changes (if any) of the configuration parameters (a) related to the amplifiers' and OADMs' (elements') hardware and to the attenuation values of the fiber spans are always random, and usually form a group of factors causing the mentioned difference between the expected up-to-date total power and the real measured total power. Such factors can be, for example, a fiber bending, a contact degradation, an amplifier's internal fault, etc.

Figure 1A:
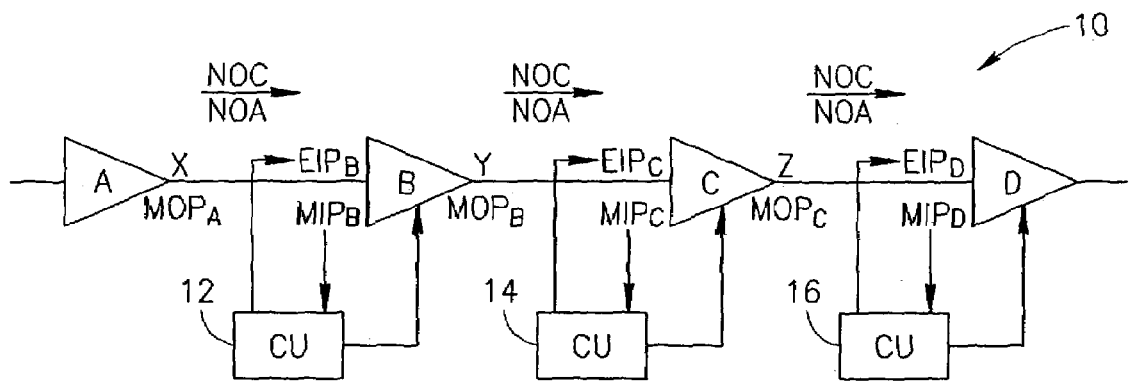
FIG. 1a illustrates a telecommunication line comprising a number of OFAs connected by fiber spans.

FIG. 1a illustrates a simplest communication line 10 comprising four OFAs marked A,B,C and D connected in a chain by optical fiber spans AB, BC and CD. The spans are characterized by respective span loss values x, y and z, known in advance and taken into account when designing the line. Each of the OFAs is characterized by its gain. For the further explanation, each of the OFAs will be associated with the following power values which, in the drawing, have indexes corresponding to the symbol of the suitable OFA: EIP (expected input total power), which is continuously calculated, MIP (measured or real input total power), which is continuously measured, MOP( measured output total power), which will also be continuously measured to indicate how the OFA reacts to changes in the line.

Let us assume the line provides continuous communication of signaling information between the OFAs which ensures recalculating the NOC and NOA parameters for each particular amplifier, thereby enabling each of the OFAs to calculate its suitable EIP. The functions of calculating NOC, NOA, EIP, comparing it with MIP and issuing an instruction of the required correction are schematically shown to be performed by individual control units 12, 14 and 16 respectively serving the amplifiers B, C and D.

Figure 1B:
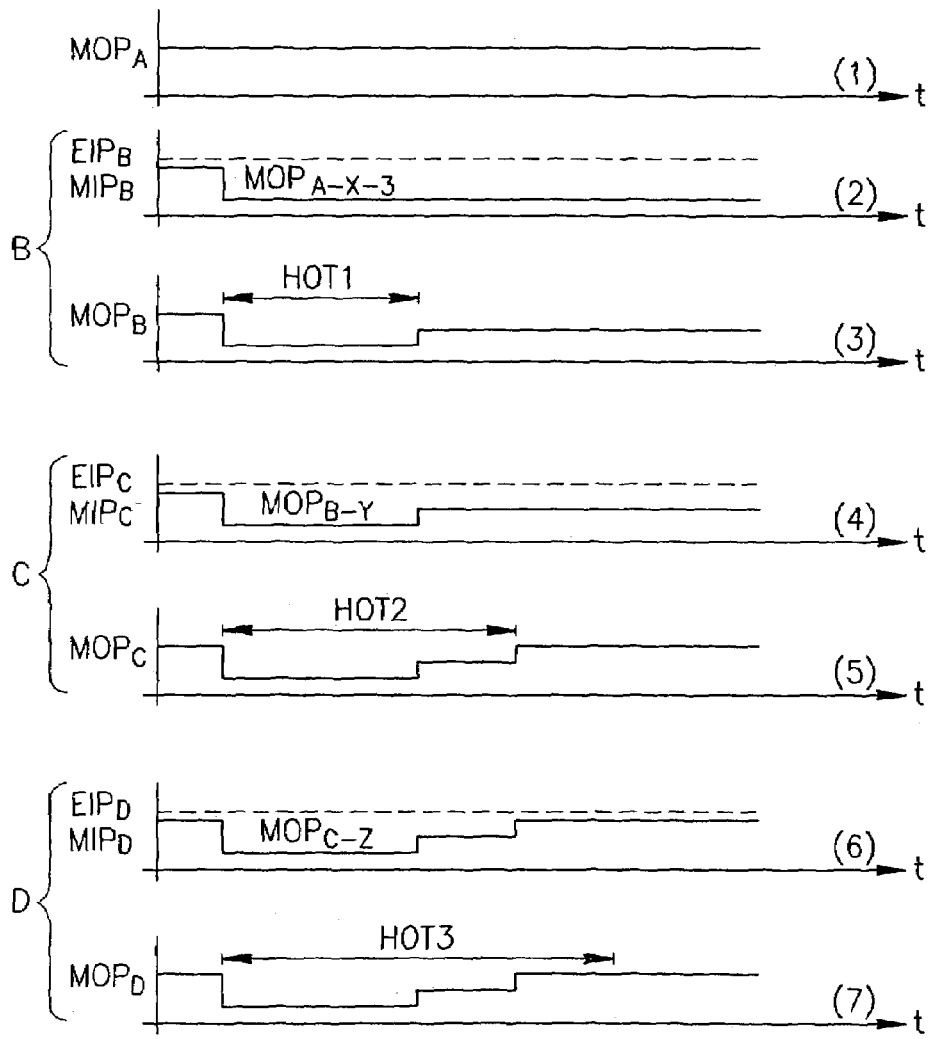

FIG. 1b illustrates a time diagram explaining the main idea of the invention using one example of operation of Line 10 shown in FIG. 1a.

Amplifier "A": Let OFA "A" generates a total output power MOPA which is constant (graph 1).

Let the number of channels NOC does not change between the OFAs A and B, and there is no fiber cut in the span AB; however, the span loss "x" of the fiber span AB has unexpectedly grew and now constitutes "x-3" [dB]. In other words, NOC and NOA do not change, as well as the expected parameter $EL_{pa}$ stays the same, while $MIP_B$ which was equal to ($MOP_{A-X}$) will change now.

What happens at amplifier "B": In view of the above, the expected input total power ($EIP_B$) at the OFA "B" stays the same, while the measured total input power ($MIP_B$) will be reduced due to the fiber span degradation ($MIP_B=MOP_{A-x}-3$ dB; graph 2). Let a local control unit 12 of the span power control reacts to the difference between the $EIP_B$ and $MIP_B$ and issues an instruction of required correction (RC) to adjust the gain of the amplifier "B". Due to that, the output power $MOP_B$ of the amplifier "B" (see graph 3), which firstly reacted to the reduced input power $MIP_B$, will restore its value at the end of a hold off time period HOT1. Let the restoration is incomplete due to some undetected internal fault of the amplifier "b".

Behavior of amplifier "C": The expected input power $EIP_C$ is constant, since no changes took place in NOC and NOA. However, the $MIP_C$ follows the shape of the $MOP_B$, since $MIP_C=MOP_{B-Y}$. (graph 4).

Owing to the fact that the amplifier "C" has a longer response time than the amplifier "B", (HOT2>HOT1), a correction block 14 will react to the difference between the $MIP_C$ and $EIP_C$ which resulted from the incomplete correction at the amplifier "B", and at the end of the HOT2 period, the gain of the amplifier "C" will be adjusted so as to provide output total power $MOP_C$ proportional to the expected total input power $EIP_C$ and not to the real total input power MIPc (graph 5).

The amplifier "D" will just repeat the waveforms received from the amplifier "C" since its response time HOT3>HOT2>HOT1, i.e., at the end of HOT3 there will be no difference between the EIPD and MNIPD.

The response times HOT are selected so as to ensure fast correction in the network, while allowing to take into account updated NOC and NOA.

The above example demonstrates how the proposed method allows controlling the constant output power (and consequently, the constant output power per channel) at any optical element of the line in a case when unexpected faults occur (degradation of the fiber span AB, internal fault in the amplifier B). The example is built for NOC, NOA=const. Though known methods of maintaining fixed power per channel provide similar results for NOC, NOA=const, they are already useless when NOC dynamically changes. For example, if $MIP_B$ in graph 2 has the shown shape not due to the increased attenuation of the fiber span AB but due to a reduction in the number of optical channels (NOC), and (as in all known methods) no EIP is calculated, the amplifier B will make unnecessary corrections to compensate the input signal degradation. Contrary to that, in the proposed method, the calculated EIP will change with the change of NOC (if any), and no unnecessary corrections will be made at the output of the amplifier B. A similar process will take place at other amplifiers of the line.

Figure 2:
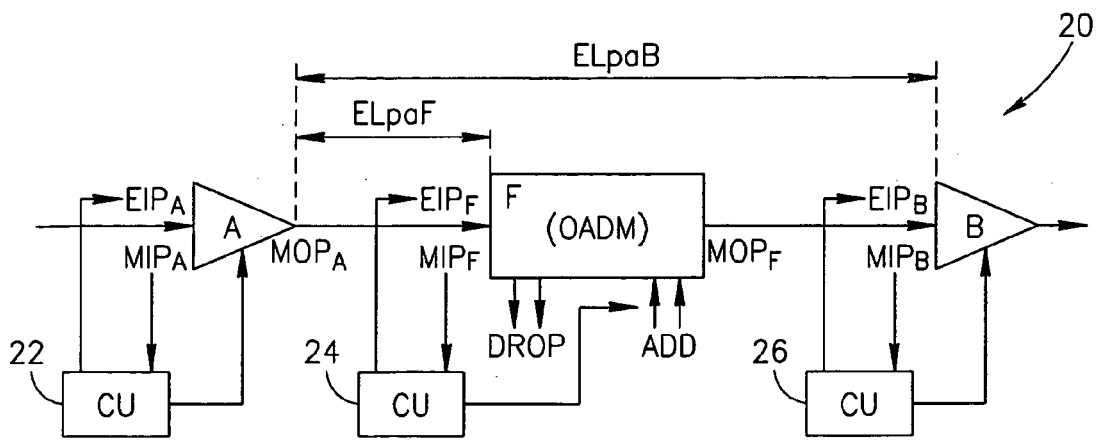
FIG. 2 illustrates a line similar to that in FIG. 1a, but comprising a passive optical element being OADM.

FIG. 2 illustrates a modified optical communication line 20 comprising three optical elements: two optical amplifiers (OFA) "A" and "B" which are connected via one OADM "F" by optical fiber spans AF and FB. The information about NOC and NOA is available at any element of the line, for example it is recalculated at the OADM like it is recalculated at any other optical element. It should be mentioned, that when calculating $EIP_F$, the $EL_{pa}$ for F ($EL_{paF}$) is equal to the span loss of the span AF. However, for calculating $EIP_B$, the $EL_{pa}$ for B ($EL_{paB}$) is equal to the span loss of the span AF+the span loss of the span FB+the insertion loss of the OADM for the through channels (i.e. the total span loss from the output of amplifier A up to the input of amplifier B). Functions of calculating NOC, NOA, EIP and RC are performed by individual control units 22, 24, 26 respectively associated with the optical elements A, F and B.

Methods for determining NOC and NOA will not be described in detail in the frame of the present application. NOC can be determined by a spectrum analyzer installed at the card of an optical element and providing the channels count in real time. Industrial spectrum analyzers are known in the art. Alternatively, NOC can be determined with the aid of messages transmitted in the line via a supervisory channel, as it is proposed in the U.S. Ser. No. 09/962337. NOA of an optical amplifier and of a passive optical element such as OADM can be determined as follows:

For OFA: NOA out=[(NOAin+1) and (not LOS)] or (LOS)and 1;

For OADM: NOA out=[NOAin and (not LOS)] or (LOS) and 0;

where: NOA out—NOA at the output of the optical element,
NOA in—NOA at the input of the optical element, and
LOS—Loss Of Signal alarm, accompanies a fiber cut condition.

Figure 3:
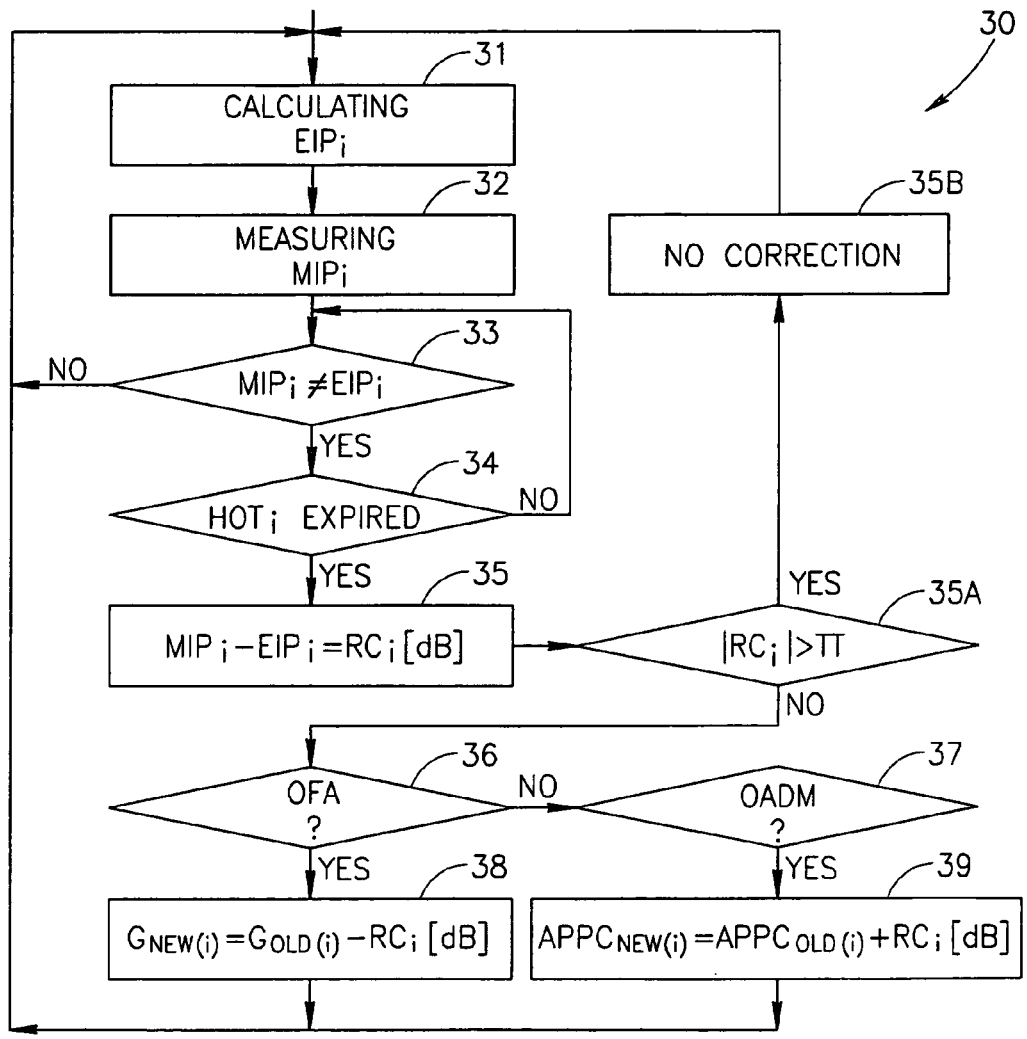
FIG. 3 illustrates a flow chart of one version of the method according to the invention, for controlling optical power in the line.
Figure 4A:
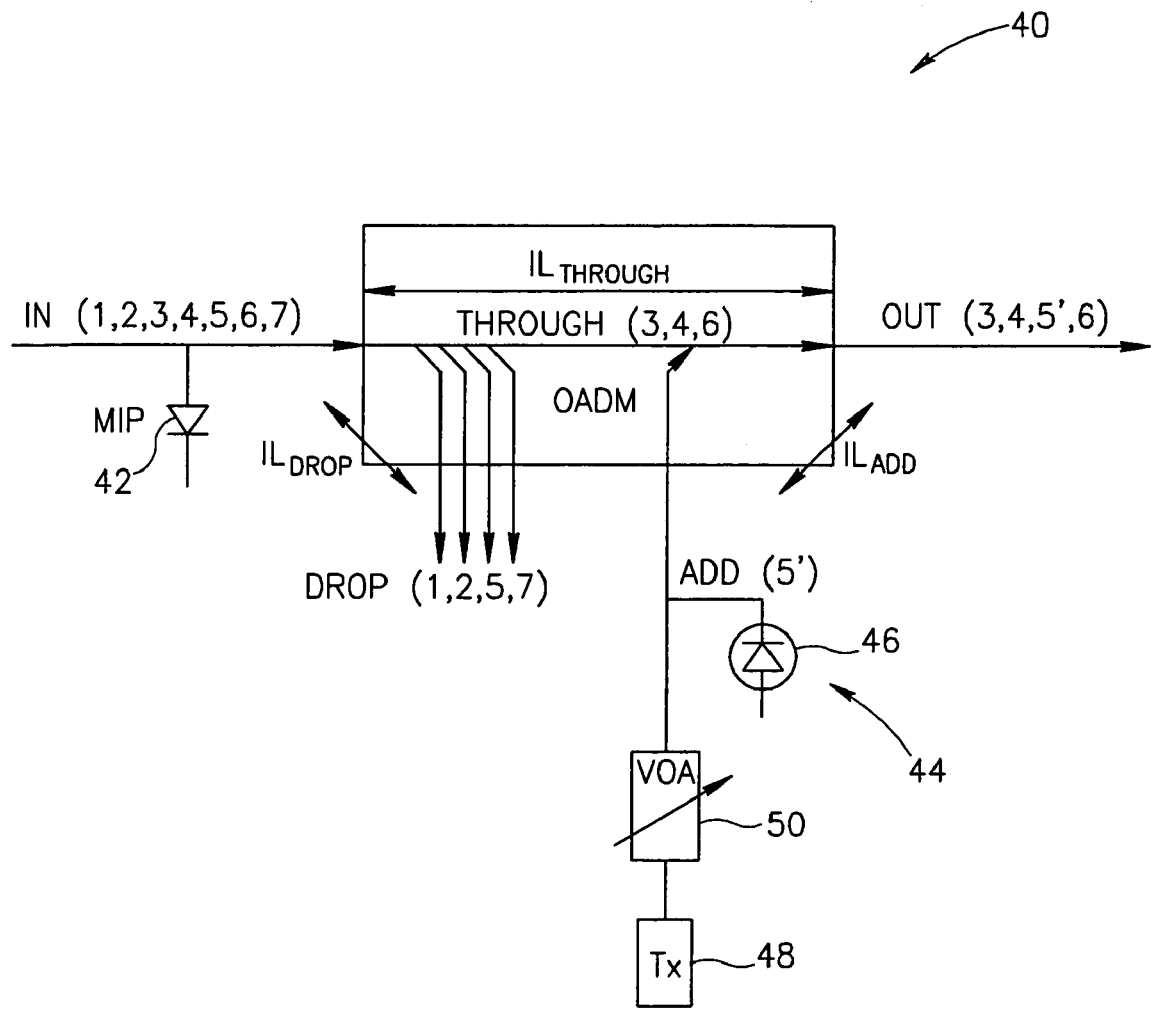
FIG. 4a schematically illustrates a block diagram of OADM with insertion loss characteristics thereof with respect to added, dropped and through channels.
Figure 4B:
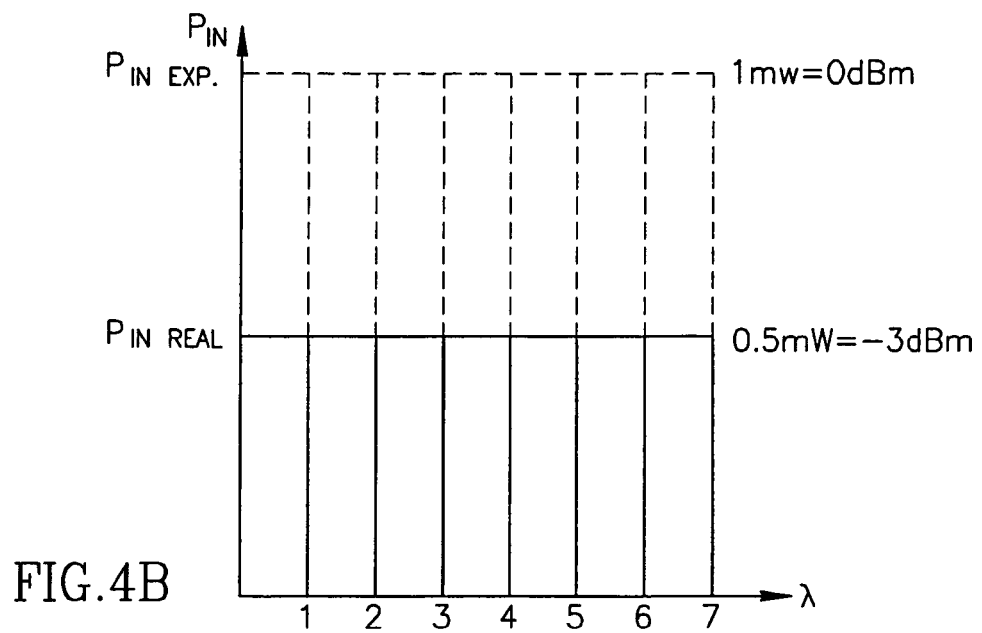
FIGS. 4b–4d illustrate power spectrums of various channels of OADM at different conditions in the line.
Figure 4C:
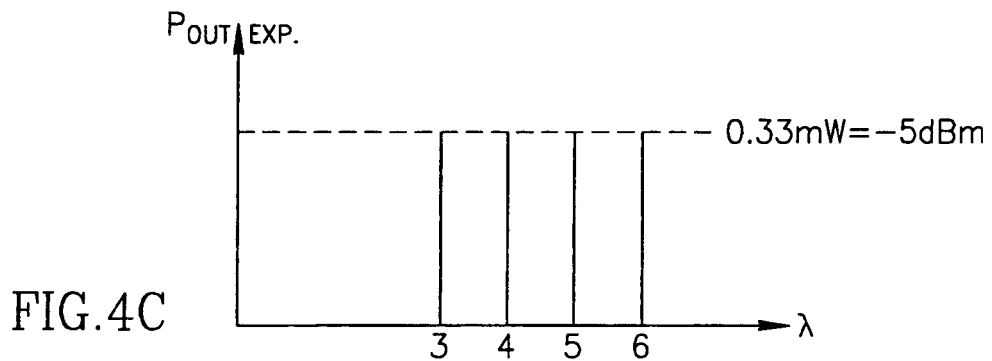
Figure 4D:
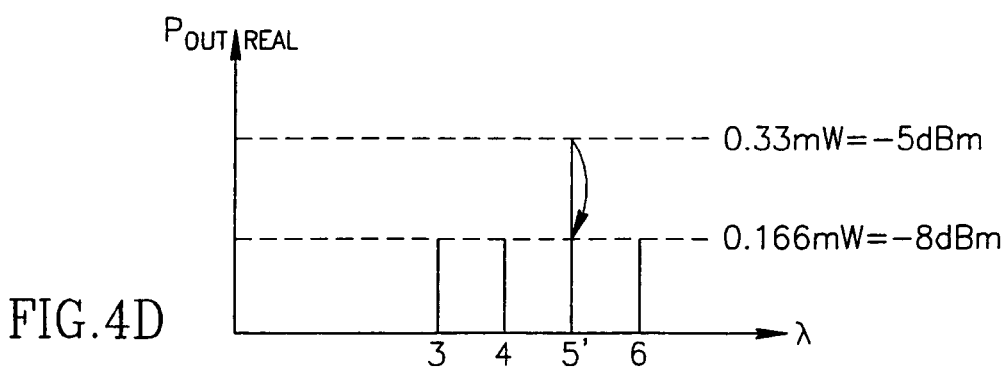

A formula for calculating EIP will be presented with reference to FIG. 3. Ways of controlling output power of OADM to equalize its output power per channel will be described with reference to FIGS. 4 and 5.

FIG. 3 is a flow chart 30 schematically explaining how different optical elements of the line 20 can be regulated to enable control of optical power per channel in the line spans. The main function of the control block implementing the flow chart is continuous calculation of EIP for each particular optical element, comparing it with a continuously measured real power (MIP) and obtaining an instruction of Required Correction (RC) for controlling power at output channels of the element, whether it is OFA or OADM.

In order to obtain the up-to-date input expected power EIP of a particular optical element, there is proposed to obtain the value of expected power issued from the previous optical amplifier by active optical channels, and subtract therefrom an expected (configured) value of the span loss ($EL_{pa}$) from the preceding amplifier up to the particular element (amplifier or OADM) of the line. This $EL_{pa}$ may include, in addition to the fiber loss, the insertion loss of a passive element (such as OADM) located between two amplifiers.

Therefore, the up-to-date Expected Input Power EIP of a particular optical element can be calculated as a sum of powers of the optical channels which should come from the preceding optical amplifier via the fiber span, plus the noise power created in the line up to the output of the preceding amplifier, and minus the span loss ELpa of the mentioned fiber span:

$$EIP[dBm]=10\times\log\{Signal_{Spa}[mW]+Noise_{pa}[mW]\}-EL_{pa}[dB]$$

where:

$Signals_{pa}[mW]$—is power, in mW, of all active optical channels at the preceding amplifier's output;

$Noise_{pa}[mW]$—is the noise, in mW, at the output of the preceding amplifier. Assuming that average noise figure of OFAs is 6 dB and that the noise is estimated over the C-band of the optical spectrum of the OFA, the coefficient 27[dBm] is obtained; if the efficient bandwidth of OFA is different, and/or the average noise figure is different, the coefficient can be adjusted;

$EL_{pa}$—expected span loss [dB] from the preceding amplifier;

and where:

$$Signal_{Spa}[mW]=NOC_{in}\times10^{(EPPC\,pa[dBm])/10};$$

$NOC_{in}$—is a number of incoming optic channels of the particular element;

$EPPC_{pa}$—expected power per channel of the previous amplifier (stated by the preliminary design)

$AVG_{pa}$—average gain of optical amplifiers in the line, up to the particular element at which EIP is calculated;

$$Noise_{pa}[mW]=NOA\times10^{(-27[dBm]+AVGpa[dB])/10};$$

NOA—the number of preceding amplifiers in the line.

It should be noted that additional parameters and criteria, for example gain tilt, can be introduced in the formula for more accurate calculation of EIP. Likewise, in some practical cases the formula can be simplified, for example from the point of considering noise.

Returning to the proposed method of maintaining the expected power per channel, whenever the up-to-date EIP is calculated and compared with the measured total input power MIP, the difference will indicate the required correction to bring the optical element to a regime for ensuring the expected output power per channel, as preliminarily designed.

In FIG. 3, Block 31 is responsible for performing the EIP calculation for a particular (i-th) optical element. Block 31 indicates obtaining results of the real time measurement of the incoming total input power at the i-th element. If the calculated and the measured values differ more than by a predetermined threshold value (block 33), the hold off time HOT of the element should expire before any corrections will be started (block 34). If, however, the MIPi differs from EIPi during the whole period of HOTi, the required correction RC is calculated as indicated in block 35. It goes without saying that RC should be more than a predetermined value to start any corrections. However, if the RC exceeds some maximally accepted value (Track, Tolerance—TT), it means that such a difference between MIP and EIP cannot or must not be corrected by the optical element. For example, the system may state that correction in a case of an input signal weakened by 10 dB is useless. In such circumstances, no correction will be made (blocks 35a, 35b).

If the optical element (i) is OFA, the RC is applied to regulate its gain (block 3 8). Since the OFA output power naturally changes in a direct proportion with the measured input total power, the correction should be applied in the inverse proportion. In other words, in case the measured total input power is, for any reason, higher than the expected input power (MIP>EIP), the correction should be calculated to reduce the OFA gain, thereby to reduce the output total power and to avoid the dangerous overpowering. In the opposite case, if the measured (real) input total power is lower that the EIP (for example, there is an unexpected extra span loss before the optical element), the OFA gain is to be increased so that to compensate the extra span loss.

Gain new[dB]=Gain old[dB]−$RC$[dB], where
$RC$=MIP−EIP;

Example: EIP=10 mW; MIP 5 mW, i.e. is twice reduced (MIP=½ EIP), or 10 log(½)=10 log1−10 log2=0−3=−3[dB];

The required correction (RC) for the OFA gain is (×½), or −3 dB:

Gain new=Gain old−(−3 dB)=Gain old+3 dB, thus the amplifier will be capable to output the unchanged output power and therefore to maintain the constant power per channel.

In some embodiments of OFA, the gain regulation can be performed by using a so-called variable optical attenuators VOA, if provided at the input of the OFA.

If the (i-th) optical element is OADM, the required correction is applied to control the output power of added channels thereof (block 39). In OADM (or VMUX), the power of an added channel is corrected in a direct proportion with the measured input power.

It should be noted that outgoing optical channels of OADM comprise those channels which have passed through the OADM and those, which have been added at the OADM. The problem is to equalize the output power of the through channels and the output power of the added channels, since their ways via the OADM are totally different and their powers never match to one another if not specifically adjusted. Therefore, in case the total input power of OADM (being a certain indication of the input power of the through optical channels) is lower than the expected value, the output power of the through channels will also be lower due to a through insertion loss; it means that the power of any one of the added channels should be also reduced to provide that the output power of every added channel be lowered accordingly and be equal the output power of the through channels.

Therefore:

$$APPC\ new = APPC\ old + RC[dB],$$

where APPC—added power per channel

Example: EIP=10 mW; MIP=5 mW, i.e. the MIP=½ EIP or the required correction RC=−3 dB. To ensure the equal power to the output channels of OADM, power of any added channel should also be reduced (multiplied by ½) to be equal to the through channels at the output of the OADM. In dB:

$$APPC\ new = APPC\ old + (-3\ dB) = APPC\ old - 3\ dB.$$

FIG. 4 explains the purpose of equalizing output powers of OADM optical channels. It schematically illustrates a block-scheme of OADM 40 which receives incoming channels number 1, 2 3, 4, 5, 6 and 7 having different wavelength and almost equal input power. Let the input power per channel is designed to be 0 dBm, which equals to 1 mW per channel. However, due to some reason, the optical channels arrive with the input power 0.5 mW or (−3 dBm). The two levels of the input power are shown on the spectrum diagram 4*b* as $P_{in} \sim \lambda$. The total incoming power MIP is measured at the input of OADM with the aid of a photo diode 42.

According to this particular example in OADM 40, channels 1, 2, 5 and 7 are dropped and will be attenuated due to the OADM insertion loss for dropped channels (ILdrop). Let us assume it equals to 3 dB. It is understood that the dropped channels will be obtained weaker than expected, but their amplification can be provided by respective customers.

A real problem appears with the channels which are to be further transmitted in the line. Channels 3, 4 and 6 pass through the OADM and are attenuated by the OADM insertion loss for through channels (ILthrough). Let ILthrough is equal to 5 dB. The expected input power of these channels is 1 mW or 0 dBm, so their expected output power will be 0.33 mW or −5 dBm (see the spectrum diagram 4*c*). Channel 5' is added to catch the place of the dropped channel 5; the added signal passes the add circuit 44 and the insertion loss of the OADM to the added channels which is marked as (ILadd). Let in this example it is equal to 3 dB. The circuit of the added channel 5' is preliminarily adjusted to such a power of the added channel (measured by a photo diode 46), to ensure, at the output of OADM 40, the output power of channel 5' equal to the expected output power of the through channels 3, 4 and 6. For example, a transmitter 48 of the channel emits the signal of 0 dBm, which is attenuated by the add circuit and ILadd, to appear at the output of the OADM with the same output power, as the through channels 3, 4 and 6 if obtained at the expected input power (−5 dBm or 0.33 mW). It means that a variable optical attenuator (VOA) 50 can be adjusted to 2 dB, so that together with ILadd=3 dB it brings the signals to the power level of −5 dBm or 0.33 mW.

Since the input channels are obtained twice weaker than expected (0.5 mW or −3 dBm), the output power of the through channels will further be weakened due to the ILthrough=5 dB, and become equal to 0.166 mW or (−8 dBm). However, the add channel 5' remains the same as it was, i.e., twice stronger that the real through channels 3, 4 and 6 (see the spectrum diagram 4*d*). To compensate for such an effect, the add circuit of the add channel 5' is to be adjusted, say by changing the value of VOA 50 to 5 dB, so that the output power of the signal of the add channel 5' becomes −8 dBm or 0.166 mW. However, the adjustment is preferably provided upon preliminarily checking the add power by the photodiode 46, and only then by affecting parameters of the circuit 44.

The adjustment described above can be arrived to, say, by using an algorithm which utilizes obtaining an expected power per output channel of OADM and correcting the OADM add power per channel using the so-called Required Correction (RC). This will further be explained using FIG. 5.

However, the power of an OADM added channel can be calculated less accurately, just by measuring the real total input power MIP and updating NOC, without calculating the expected power and taking into account the NOA and noise figure parameters:

$$APPC = [MIP - 10\ \log(NOC)] - IL_{OADM} \pm CO [dBm],$$

where APPC—is the added power per channel,

[MIP−10 log(NOC)]—gives an average input power per one incoming channel, which serves an indication of an output power of a through channel of the OADM;

$IL_{OADM}$—insertion loss introduced by OADM; this parameter takes into account the attenuation created by OADM to the through and add channels thus enabling estimation of the power of the added channel; if the output channels' power is to be equalized, so ([MIP−10 log(NOC)]−IL through)=(APPC−IL add), and APPC=[MIP−10 log(NOC)]−(IL through−IL add); thus IL OADM=(IL through−IL add);

±CO is a manually introduced channel offset, which is usually selected for a particular channel in order to give it a pre-emphasis. This practice is caused by the fact that any OFA has noticeably different specific gains for different wavelengths. The channel offset thus gives a means to slightly regulate fluctuations in the line caused by the above fact.

Figure 5:
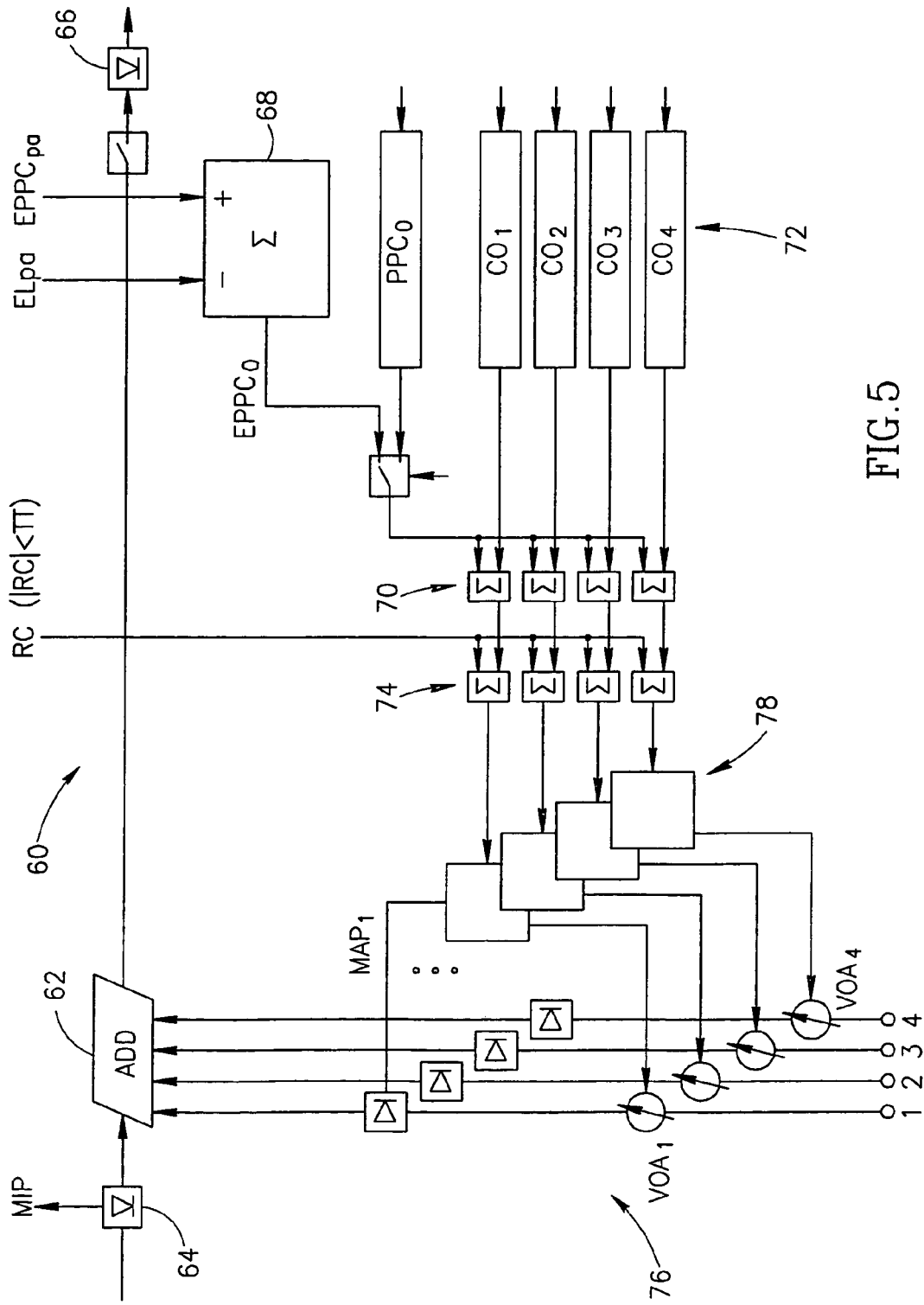
FIG. 5—is a block-diagram illustrating one way of controlling the power of added channels of OADM.

FIG. 5 illustrates a block diagram of a system 60 for adjusting add power of different add channels in OADM, using the preferred version of the method. The diagram of system 60 partially shows operations performed for controlling the output power of OADM which are schematically shown as block 24 in FIG. 3.

In the block diagram of FIG. 5, OADM 62 is shown as its add block inserting four optical channels 1, 2, 3 and 4 into the line. At the input of OADM, measurement of the real input total power (MIP) is performed by a photo diode 64. At the output of OADM, the real (measured) total output power (MOP) is obtained by a photodiode 66. A processing block 68 obtains data about the expected power loss from the previous amplifier (ELpa) and about the expected power per channel from the previous amplifier (EPPC pa), as well as data on insertion losses of the OADM. These values are known from the preliminary design and from the OADM characteristics. Based on them, the expected power per channel at the output (EPPCo) is calculated. Actually, instead of the calculated EPPCo an operator may choose to use a constant pre-configured value of the power per channel at the output PPCo. The selected value is further sent to summing blocks 70 of the add channels, which modify the power per channel at the output by a channel offset CO (blocks 72) which is individual for each specific optical channel and depends on the degree of attenuation which the particular wavelength undergoes in the line. Upon modifying the reference values of the selected output power per channel, they are respectively corrected in summing blocks 74 by adding the Required Correction to each modified value received from 70. The RC for this particular OADM is calculated based on the difference between the MIP (total) and EIP(total), as explained above with reference to FIG. 3 (/RC/<TT). The blocks 74 issue respective required add power (RAP) values for the four add channels. Based on information on the real measured add power (MAP) obtained from a photo diode of each of the add channels' circuits 76, four further processing blocks 78 produce commands according to which the circuits 76 of the add channels are respectively regulated. The regulation is performed by introducing a suitable attenuation value to each of the add channels' circuit, say by regulating VOA of the circuit. As a result, each of the add channels is attenuated not only according to its individual properties, but also based on accurate calculations of the expected output value. Moreover, the proposed system ensures accurate regulation of any add channel power irrespectively to accuracy of the power source of each specific add channel.

While the invention has been described with reference to the particular embodiments, it should be appreciated that modified versions of the method and other embodiments of the optical module and system can be proposed, which are all to be considered part of the present invention.

The invention claimed is:

1. A method of real time control of power per optical channel in a multi-channel optical communication line formed by a group of optical elements connected in a chain by fiber spans, wherein the group of elements comprises one or more optical fiber amplifiers (OFA), and wherein each of the spans is characterized by its span loss, while each of the OFA is characterized by its gain and its designed output power per channel,
the method comprises the following steps performed in real time:
calculating, for a particular optical amplifier (OFA) in the line, an expected total input power value (EIP), based on a number of parameters stated by a preliminary design of the line, and a number of parameters changeable during operation and including at least up-to-date number of active optical channels (NOC) and up-to-date number of preceding optical amplifiers (NOA) for said OFA,
measuring a real total input power (MIP) at said particular optical amplifier, and
if a difference between the expected total input power EIP and the real total input power MIP at said particular OFA exceeds a predetermined value, adjusting the gain of said OFA to maintain its output power per channel constant.

2. The method of claim 1, being performed at all optical amplifiers OFA in the line to maintain constant output power at the fiber spans associated with said OFAs.

3. The method according to claim 1, suitable for the group of elements in the line, wherein said line, in addition to the optical amplifiers, comprises one or more optical add drop multiplexers (OADMs).

4. The method according to claim 3, additionally comprising the following steps performed periodically or continuously:
calculating, for a particular OADM in the line, an expected total input power value (EIP),
measuring a real total input power (MIP) at said particular OADM,
in case of a difference between the expected total input power and the real total input power at said particular OADM exceeds a predetermined value, controlling power of each of added channels of said OADM to follow said difference, thereby to equalize output power of all optical channels outgoing from said OADM.

5. The method of claim 4, wherein the step of calculating the expected total input power is performed using up-to date values of NOC (number of active optical channels) and NOA (number of preceding optical amplifiers in the line).

6. The method according to claim 3, wherein all OADMs in the line are monitored to ensure the equalized output power per channel in the fiber spans associated with said OADMs, thereby controlling all fiber spans in the line to have constant power per channel for the OFAs and equalized power per channel for the OADMs.

7. The method according to claim 4, comprising determining power of an OADM added channel based on measuring MIP and updating NOC, and substantially close to the following formula:

$$APPC=[MIP-10\ \log(NOC)]-IL\ OADM\pm CO[\text{dBm}],$$

where APPC—is the added power per channel,
[MIP−10 log(NOC)]—an average input power per one incoming channel;
IL OADM—insertion loss introduced by OADM;
±CO—a manually introduced channel offset, specific for a particular optical channel.

8. The method according to claim 1, wherein said parameters stated in a preliminary design of the line being selected from the following list comprising: gains of the optical amplifiers, span losses, initial values of NOC and NOA for any point in the line, and an expected output power per channel for each optical amplifier OFA.

9. The method according to claim 1, comprising calculating the EIP substantially close to the following formula:

$$EIP[\text{dBm}]=10\ \log\{Signalspa[\text{mW}]+Noisepa[\text{mW}]\}-ELpa[\text{dB}],\text{ where}$$

Signalspa[mW]—is power, in mW, of all active optical channels at the preceding amplifier's output;
Noisepa[mW]—is the noise, in mW, at the output of the preceding amplifier;
ELpa—expected span loss[dB] from the preceding amplifier;
and where $$Signalspa[\text{mW}]=NOC_{in}\times 10^{(EPPC\ Pa[\text{dBm}])/10};$$

NOC in—is a number of incoming optic channels of the particular element;
EPPCpa—expected power per channel of the previous amplifier;

$$Noisepa[\text{mW}]=NOA\times 10^{(-27[\text{dBm}]+AVGPa[\text{dB}])/10};$$

NOA—the number of preceding amplifiers in the line;
AVGpa—average gain of optical amplifiers in the line, up to the particular element at which the EIP is calculated.

10. The method according to claim 1, wherein
the difference between the real measured total power and the updated expected total power at a particular point in the line constitutes the required correction RC (RC=MIP−EIP[dB]) to be applied to the optical element to ensure at its output either a constant power per channel or the equalized power per channel.

11. The method according to claim 10, comprising correcting the OFA gain as follows:

Gain new=Gain old−RC[dB].

12. The method according to claim 10, comprising correcting power of an added channel of OADM as follows:

APPCnew=APPCold+RC[dB], where APPC—added power per channel.

13. The method according to claim 1, comprising determining a hold off time HOT as time passing between the moment of detecting a difference between the EIP and MIP and the moment of adjusting the gain of OFA or correcting the power of add channels of OADM, and selecting said HOT values of the optical elements as gradually increasing in the direction of transmission, to allow timely updating of each optical element from the point of NOC and NOA and correcting output power of each particular optical element after the preceding optical elements have done their corrections.

14. A system configured to implement the method according to claim 1.

15. A module for controlling output power per channel of a particular optical element in a telecommunication line comprising at least optical amplifiers OFAs interconnected by fiber spans, the module being configured to implement the method according to claim 1, thereby serving the particular optical element in the line.

16. A method of real time control of power per optical channel in a multi-channel optical communication line formed by a group of optical elements connected in a chain by fiber spans, wherein the group of elements comprises one or more optical fiber amplifiers (OFA), and wherein each of the spans is characterized by its span loss, while each of the OFA is characterized by its gain and its designed output power per channel, the method comprises the following steps performed either periodically or continuously:

calculating, for a particular optical amplifier (OFA) in the line, an expected total input power value (EIP), measuring a real total input power (MIP) at said particular optical amplifier, if a difference between the expected total input power EIP and the real total input power MIP at said particular OFA exceeds a predetermined value, adjusting the gain of said OFA to maintain its output power per channel constant, and wherein the step of calculating the expected total input power is performed using up-to date values of NOC (number of active optical channels) and NOA (number of preceding optical amplifiers in the line).

17. An optical module comprising an optical element and a control unit for controlling output power per channel of the optical element in real time, said optical element being designed to be coupled to an optical communication line via optical fiber spans and to receiving an incoming multi-channel optical signal to form an outgoing multi-channel optical signal, said control unit, in real time, calculating a value of expected total input power (EIP) of the optical element based on a number of parameters stated by a preliminary design of the line, and a number of parameters changeable during operation and including at least a number of active optical channels (NOC), wherein said control unit obtaining up-to-date values of NOC and NOA for said optical element, obtaining a value of measured total input power (MIP) of the optical element, comparing the EIP with the MIP and, if the difference there between exceeds a predetermined value, producing a signal of a required correction to be applied to the optical element for controlling the output power per channel of the optical element.

18. The optical module according to claim 17, wherein said control unit is capable of calculates the EIP substantially close to the following formula:

$EIP[dBm]=10 \log\{Signalspa[mW]+Noisepa[mW]\}-ELpa[dB]$, where

Signalspa[mW]—is power, in mW, of all active optical channels at the preceding amplifier's output;

Noisepa [mW]—is the noise, in mW, at the output of the preceding amplifier;

ELpa—expected span loss [dB] from the preceding amplifier;

and where $Signalspa[mW]=NOC_{in} \times 10^{(EPPCpa[dBm])/10}$;

NOC in—is a number of incoming optic channels of the particular element;

EPPCpa—expected power per channel of the previous amplifier;

$Noisepa[mW]=NOA \times 10^{(-27[dBm]+AVGpa[dB])/10}$;

NOA—is a number of preceding amplifiers in the line;

AVGpa—average gain of optical amplifiers in the line, up to the particular element at which the EIP is calculated.

19. The optical module according to claim 17, wherein said optical element is an optical fiber amplifier OFA, and wherein said control unit applies said signal of the required correction for adjusting the gain of said OFA to maintain its output power per channel constant.

20. The optical module according to claim 17, wherein said optical element is an optical add drop multiplexer (OADM), and wherein said control unit being applies said signal of the required correction to control power of each of added channels of said OADM thereby equalizing output power of all optical channels outgoing from said OADM.

21. A set of optical modules including at least one first module according to claim 17, and at least one second module comprising an OADM and a control unit for controlling power of added channels of the OADM, the second module being capable of:

obtaining, in real time, a value of a measured total input power MIP of the OADM, obtaining, in real time, an up-to date value of NOC, calculating power of an added channel of the OADM close to the following formula:

$APPC=[MIP-10 \log(NOC)-]IL\ OADM \pm CO[dBm]$, where APPC—is the added power per channel,

[MIP−10 log(NOC)]—an average input power per one incoming channel;

IL OADM—insertion loss introduced by OADM;

±CO—a manually introduced channel offset, specific for a particular optical channel.

* * * * *